(No Model.)
W. CONVERSE.
ENDLESS TRAVELING BELT CARRIER.
No. 248,713. Patented Oct. 25, 1881.
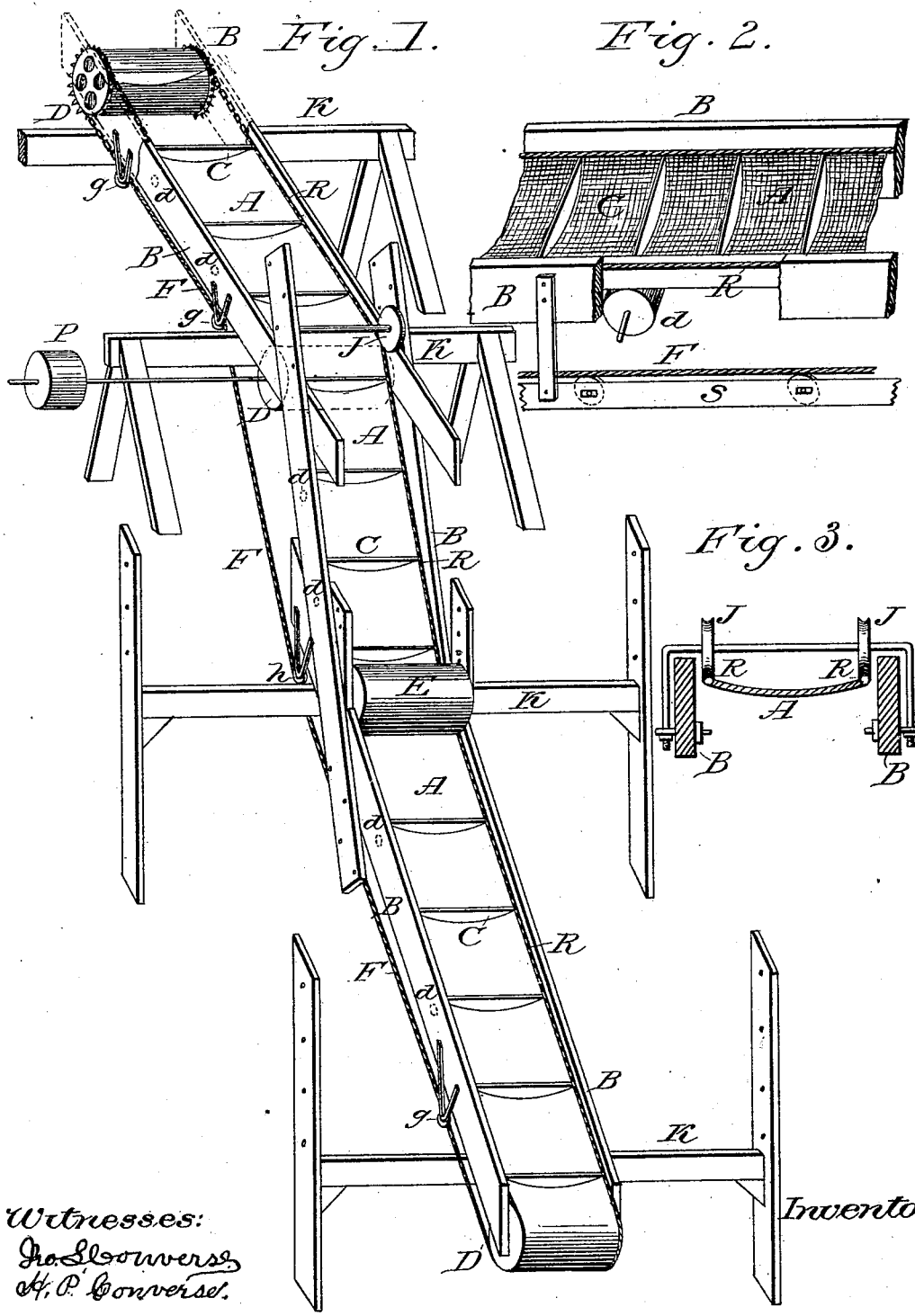
Witnesses:
Geo. S. Converse
H. P. Converse
Inventor:
Wade Converse

UNITED STATES PATENT OFFICE.

WADE CONVERSE, OF COLUMBUS, OHIO.

ENDLESS TRAVELING BELT CARRIER.

SPECIFICATION forming part of Letters Patent No. 248,713, dated October 25, 1881.

Application filed January 18, 1881. (No model.)

*To all whom it may concern:*

Be it known that I, WADE CONVERSE, a citizen of the United States, residing in the city of Columbus, in the county of Franklin and State of Ohio, have invented a new and useful Improvement in Carriers, which has not been patented or used in any foreign country to my knowledge.

Said invention is fully set forth in the following specification, reference being had to the accompanying drawings.

My invention consists in, first, the use of a rope or chain secured on the edges of an endless traveling belt carrier, which serves the purpose of strengthening the belt, increasing friction, and at the same time prevents the material from falling off the belt in the course of its passage; second, the combination of an endless belt with a frame-work and supporting-rollers, so that the return-belt may be used for the conveyance of brick, mortar, and other material to such point as may be needed for use in a trench or tunnel while the endless belt is being used to carry materials from such trench or tunnel; third, a friction-wheel composed of india-rubber, wood, or other material so arranged as to be made to press upon the belt, ropes, or chains on either or both edges of said belt, as aforesaid, by the use of an adjusting-screw.

Figure 1 of the drawings represents a perspective of my carrying device. Fig. 2 is a view of a section of the belt or carrier, partly in section, and on an enlarged scale from that shown in Fig. 1. Fig. 3 is a detail view of the friction-rollers.

In using my said improvement the rope or chain may be fastened to each edge of the continuous belt throughout its circuit without break; but I prefer to construct my belt in sections of suitable length, attach the rope or chain to each side of the sections, and then attach the sections together, thus forming the continuous belt. The rope or chain greatly strengthens the belt, increases its friction on the drum where the power is applied, and prevents the earth and other material from falling off the belt before it reaches its place of deposit. The attachment of the rope or chain to the edges of the belt is made by any suitable fastening—such as cord, wire, or hooks—and in case the belting is composed partly of slats the attachment may be made by staples.

In an endless traveling belt carrier the loaded belt is supported and carried on rollers at short intervals in a frame-work supported on trestles, posts, or braces.

The second part of my invention consists in attaching brackets to such frame-work and suspending rollers thereby, singly or in series, below the loaded belt, for the support of the return-belt, so arranged as that the return-belt may be loaded with brick, mortar, or other material and be conveyed on said return-belt to such point as they may be needed for use. Such return-belt may be loaded and used for said purposes at the same time that the endless-belt carrier is used for the removal of materials in an opposite direction out of a trench or tunnel. To that end I construct my frame-work for the belt carrier in sections of twenty feet each. The sides are made of one and one-quarter inch lumber, eight or ten inches wide, and as far apart as the width of the belting. I construct my rollers of wood five or six inches in diameter, and fasten them three or four feet apart, between the sides of this ladder-like frame-work, and support in place on iron axles extending from one side of the frame-work to the other. The rollers are supplied with boxing to prevent wear and friction. The sections are fastened together end to end by fish-joints, and the number may be increased or diminished, according to the length of the belting. The whole frame-work is supported on trestles or posts. For the return-belting, when to be used for carrying a load, supporting-rollers may be suspended by brackets from said frame-work, as represented at *g* in the drawings; but I prefer, when the return-belt is to be loaded, to support it on rollers in a frame-work similar to the upper, and suspended from the upper frame-work by straps of iron, in which case I make the attachment of the lower frame-work to the upper frame-work by a bolt and nut, so that when the return-belting is not to be used for a load the lower frame-work may be dispensed with. The lower frame-work and attachment are represented at S.

Another part of my invention consists in the use of a friction-wheel composed of rubber or other material, and running on the rope on either side of the belting, which may be elevated or depressed by a screw, which increases or diminishes the pressure on the rope.

I construct friction-wheels of rubber or wood and place them with the perimeter above a drum or roller a sufficient distance to allow the passage of the rope attached, as aforesaid, to the belting, and so fasten said friction-wheels to the frame-work on an axle as to allow them to turn easily with the motion of the rope, and by the adjusting-screw the friction of the rope on the drum may be increased or diminished. The purpose of the friction-wheel is to increase the friction of the belting on the drum or roller where the power is applied, to prevent the slipping of the belt and insuring to it motion while loaded.

The several objects above mentioned are attained by the mechanism illustrated in the accompanying drawings, representing an endless-belt carrier for the removal of materials from a trench or tunnel and depositing them at a different level, and where required.

The several improvements which I claim as my invention are shown in the accompanying drawings, similar letters referring to similar parts throughout.

A represents the continuous carrier-belt; B, the sides of the frame-work; C, cross-pieces on the belting to prevent sliding of material on an incline; D, drums at the ends of the carrier, around which the belting moves, and also a drum at the top of the elevation, to either of which drums the power may be applied, as represented at P.

d represents the rollers in the frame-work supporting the belt.

E represents a drum at the lower level, fastened to the frame-work, under which the loaded belt passes, so as to prevent the belt from rising when the power is applied.

R represents the rope attached to each edge of the carrier-belt.

g represents the rollers for the support of the return-belt; S, a frame-work containing a series of rollers supporting the return-belt.

J represents the friction-wheel used to increase the friction of the belt upon the drum.

K represents the trestle and other support of the frame-work.

h represents a small roller to prevent the return-belt from rising when the power is applied.

I claim as my invention and desire to secure by Letters Patent for the same—

1. The combination, with a belt to carry earth, of a rope or chain secured upon the edges of said belt, for the purpose of increasing friction, strengthening the belt, and to prevent such material from falling off the belt while in motion, substantially as set forth.

2. In an endless traveling belt carrier, the combination of such belt with the supporting-frames, in the manner substantially as described, whereby the under or return side of the belt is employed to convey the brick, mortar, or other material forward to the desired point for use, substantially as described and shown.

3. The combination of the adjustable rubber rollers with said edge rope, for the purpose of increasing the friction of the belt on the drum where the power is applied, and thus preventing the slipping of the belt and securing its motion, substantially as described and shown.

WADE CONVERSE.

Witnesses:
GEO. S. CONVERSE,
MARY C. FOLLETT.